United States Patent
Liu

(10) Patent No.: US 12,403,391 B2
(45) Date of Patent: Sep. 2, 2025

(54) GAMEPAD

(71) Applicant: Shenzhen Qanba Technology Development Co.,Ltd, Shenzhen (CN)

(72) Inventor: Kai Liu, Shenzhen (CN)

( * ) Notice: Subject to any disclaimer, the term of this patent is extended or adjusted under 35 U.S.C. 154(b) by 324 days.

(21) Appl. No.: 18/124,004

(22) Filed: Mar. 21, 2023

(65) Prior Publication Data

US 2023/0218990 A1    Jul. 13, 2023

(30) Foreign Application Priority Data

May 10, 2022   (CN) .......................... 202221118656.X

(51) Int. Cl.
*A63F 13/24*   (2014.01)
*A63F 13/214*   (2014.01)

(52) U.S. Cl.
CPC ............ *A63F 13/24* (2014.09); *A63F 13/214* (2014.09)

(58) Field of Classification Search
CPC .................................. A63F 13/24; A63F 13/21
See application file for complete search history.

(56) References Cited

U.S. PATENT DOCUMENTS

| | | | | |
|---|---|---|---|---|
| 5,451,053 | A | * | 9/1995 | Garrido .................... A63F 13/95 463/37 |
| 6,290,228 | B1 | * | 9/2001 | Roberts ................. A63F 13/245 463/47 |
| 2005/0009606 | A1 | | 1/2005 | Murzanski et al. |
| 2005/0215321 | A1 | * | 9/2005 | Hussaini ................. A63F 13/24 463/37 |
| 2007/0249422 | A1 | * | 10/2007 | Podoloff ................. G06F 3/048 463/43 |
| 2012/0280087 | A1 | | 11/2012 | Coffman et al. |
| 2019/0325116 | A1 | | 10/2019 | Lin et al. |
| 2024/0416225 | A1 | * | 12/2024 | Crittenden .............. A63F 13/24 |

* cited by examiner

*Primary Examiner* — Peter J Iannuzzi
(74) *Attorney, Agent, or Firm* — Hemisphere Law, PLLC; Zhigang Ma

(57) ABSTRACT

A novel gamepad is provided, which relates to the technical field of game peripherals. The novel gamepad includes a gamepad body, grips, and a D-pad, ABXY buttons, trigger buttons and thumb levers which are arranged on the gamepad body; main control buttons for arcade game are also arranged on the gamepad body; and the main control buttons for arcade game are arranged on one sides of the thumb levers. By the adoption of the above technical solution, the novel gamepad has the advantages of reasonable structural design, diversified function input modes, wide application range and convenience in use.

13 Claims, 3 Drawing Sheets

GAMEPAD

TECHNICAL FIELD

The present disclosure relates to the technical field of game peripherals, specifically to a novel gamepad.

BACKGROUND

Gamepad is a common component of an electronic game console. By manipulating its buttons and lever, simulated characters on mobile phones, computers and other electronic devices can be controlled.

At the same time, different gamepads are required in different games. For example, in PS4, X-Box and other games, a traditional gamepad is usually used which mainly includes a D-pad, ABXY buttons and the like, this can also refer to EP3801792B1 for reference, and the ABXY buttons refer to A, B. X and Y buttons for corresponding operations. In fighting and arcade games, a special gamepad with eight buttons is required. Since the positions of the buttons correspond to the positions of all the fingers, the two kinds of gamepads have inconsistent input gesture habits.

For a user playing PS4, X-Box, a fighting game and an arcade game at the same time, since the input gesture habits of the traditional gamepad and the gamepad special for arcade game are inconsistent, the two kinds of gamepads can only match the corresponding games. Therefore, the user usually needs to use the corresponding gamepads when playing different types of games, resulting in cumbersome and unsmooth game operations, which seriously affects the continuous and fluent progress of a game and the player's experience. Therefore, it is urgent to propose a gamepad with both the above two modes to improve the game experience.

SUMMARY

The present disclosure aims to provide a novel gamepad for the defects and shortcomings in the prior art. The novel gamepad has the advantages of reasonable structural design, diversified function input modes, wide application range and convenience in use.

In order to achieve the above objective, the technical solution adopted in the present disclosure is as follows: A novel gamepad includes a gamepad body, grips, and a D-pad, ABXY buttons, trigger buttons and thumb levers which are arranged on the gamepad body. Main control buttons for arcade game are also arranged on the gamepad body; and the main control buttons for arcade game are arranged on one sides of the thumb levers.

In a further setting of the present disclosure, there are eight main control buttons for arcade game including arcade game ABXY buttons and arcade game trigger buttons.

In a further setting of the present disclosure, an end surface of the gamepad body far from a user is also provided with a touch-control panel, and an end surface close to the user is provided with a 3.5 audio output hole.

In a further setting of the present disclosure, the gamepad body is provided with a bearing plummer; and the bearing plummer is arranged under the main control buttons for arcade game.

In a further setting of the present disclosure, one side of the bearing plummer upwards extends to form a beveled hand support connected to the gamepad body; and an inclination angle of the beveled hand support gradually increases from the left grip to the right grip.

In a further setting of the present disclosure, a battery compartment is arranged in a space of the bearing plummer arranged below the beveled hand support.

In a further setting of the present disclosure, there are two thumb levers symmetrically distributed on the gamepad body.

In a further setting of the present disclosure, the gamepad body further includes a selector switch for achieving switching between a traditional input mode and an arcade game input mode; in the traditional input mode, the D-pad, the ABXY buttons, the trigger buttons and the thumb levers receive an input signal; in the arcade game input mode, the main control buttons for arcade game and the thumb levers receive an input signal.

By the adoption of the above technical solution, the present disclosure has the following beneficial effects.

1. In the present disclosure, the grips, the D-pad, the ABXY buttons, the trigger buttons and the thumb levers suitable for PS4, X-Box and other games, and the main control buttons for arcade game suitable for fighting arcade games are arranged on the gamepad body at the same time, so that the gamepad has two input modes. A user can select the corresponding input modes when playing different games, so the novel gamepad can be applied to most games in the market. The novel gamepad has a wide application range and is favorable for improving the operating flexibility and improving the user experience.

2. In the present disclosure, the gamepad body is provided with the bearing plummer and the beveled hand support. During use, the entire gamepad is placed steadily and not easy to slid. The wrists are stressed stably, which is conductive to uniformly supporting the hands and improving the operating convenience, thus further improving the user experience in the arcade game input mode. The novel gamepad has the advantages of reasonable structural design, diversified functions, wide application range and convenience in use.

BRIEF DESCRIPTION OF THE DRAWINGS

In order to describe the embodiments of the present disclosure or the technical solutions in the prior art more clearly, drawings required to be used in the embodiments or the illustration of the existing art will be briefly introduced below. Obviously, the drawings in the illustration below are merely some embodiments of the present disclosure. Those ordinarily skilled in the art also can acquire other drawings according to the provided drawings without doing creative work.

Figure 1:
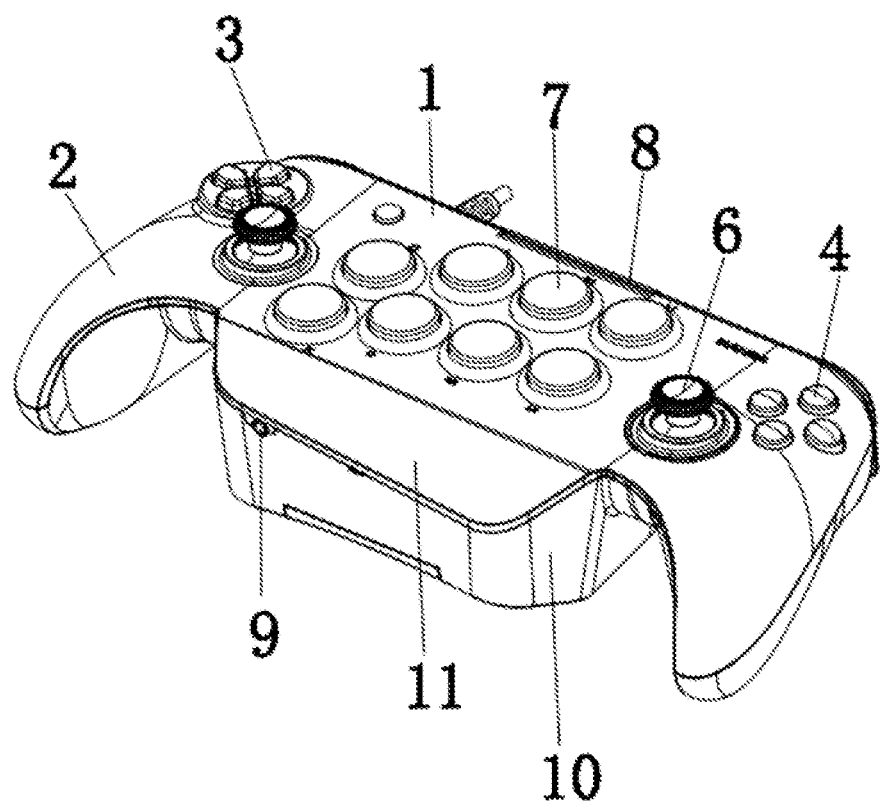
FIG. 1 is a schematic structural diagram of this embodiment.

Numerals in the drawings:
1: gamepad body; 2: grip; 3: D-pad; 4: ABXY buttons; 5: trigger button; 6: thumb lever; 7: main control button for arcade game; 8: touch-control panel; 9: 3.5 audio output hole; 10: bearing plummer; 11: beveled hand support; 12: battery compartment; and 20: antiskid pad.

DETAILED DESCRIPTION OF THE EMBODIMENTS

The present disclosure is further described in detail below in combination with accompanying drawings.

This specific embodiment is only an explanation of the present disclosure, and it is not a limitation to the present disclosure. After reading this specification, those skilled in the art can make modifications to this embodiment that do not create any contribution as needed, but the modifications shall be protected by the patent law within the scope of the claims of the present disclosure.

Figure 2:
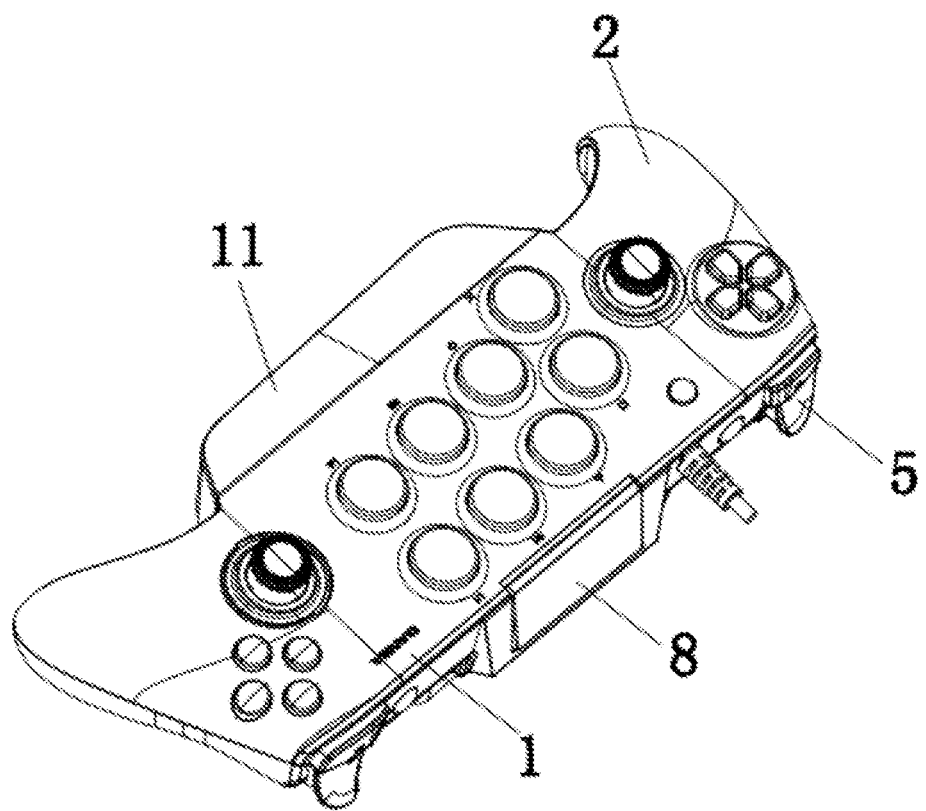
FIG. 2 is another schematic structural diagram in this embodiment.

This embodiment relates to a novel gamepad, as shown in FIG. 1 and FIG. 2, including a gamepad body 1, grips 2, and a D-pad 3, ABXY buttons 4, trigger buttons 5 and thumb levers 6 which are arranged on the gamepad body 1. The D-pad 3 is arranged above the left grip 2. The ABXY buttons 4 are arranged above the right grip 2. The trigger buttons 5 are respectively arranged one sides of the left and right grips 2 far from a user. During operation, the trigger buttons are convenient to hold for triggering with index fingers. There are two thumb levers 6 symmetrically distributed on the gamepad body 1.

In this embodiment, as shown in FIG. 1, main control buttons 7 for arcade game are also arranged on the gamepad body 1. The main control buttons 7 for arcade game are arranged on one sides of the thumb levers 6. Specifically, the main control buttons 7 for arcade game are arranged between the two thumb levers 6. It should be noted that there are eight main control buttons 7 for arcade game including arcade game ABXY buttons and arcade game trigger buttons. Furthermore, the eight buttons are set according to a distribution rule on a shaft joystick for arcade game. Therefore, the novel gamepad is a special gamepad for fighting and arcade games, so the novel gamepad can be applied to PS4, X-Box and other games, and to more fighting and arcade games, and has a wide application range. For customers, it is not necessary to buy two different gamepads for the above two types of games, which is conducive to reducing the purchase cost and reducing the occupation space. For manufacturers, the novel gamepad has two input modes, which can be applicable to users having different input habits and different types of games, thus greatly increasing the number of audiences.

In combination with FIG. 1 and FIG. 2, in order to further improve the operation convenience and use experience of the novel gamepad, an end surface of the gamepad body 1 far from a user is also provided with a touch-control panel 8, and an end surface close to the user is provided with a 3.5 audio output hole 9. Since the touch-control panel 8 is arranged on the end surface, it is conducive to avoiding mistouch of the touch-control panel 8 in a process of operating the gamepad, and at the same time, the occupation of a space on the surface of the gamepad body 1 can be reduced. The user can connect a headset through the 3.5 audio output hole 9 during use, thus avoiding the impact of an external environment during the operation and improving the game experience.

Figure 3:
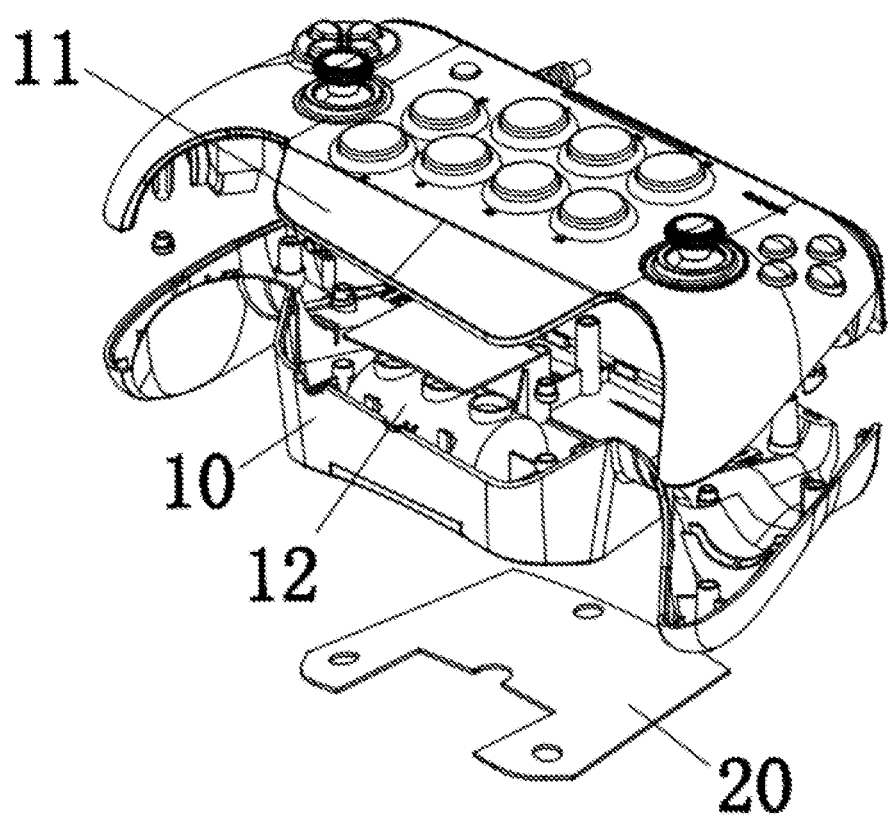
FIG. 3 is a schematic exploded diagram in this embodiment.

Due to a large operation force applied in the fighting and arcade games, the stability of the novel gamepad is required to be high in the arcade game input mode. As shown in FIG. 1 to FIG. 3, in this embodiment, the gamepad body 1 is provided with a bearing plummer 10. When the novel gamepad is placed on a desktop, bottoms of the left and right grips 2 and a bottom surface of the bearing plummer 10 are located on the same horizontal plane, so as to play a common bearing role. In other embodiments, the bottoms of the left and right grips 2 can also be higher than the bottom surface of the bearing plummer 10, and the bearing plummer 10 plays a bearing role alone. As shown in FIG. 3, the bottom surface of the bearing plummer 10 is provided with an antiskid pad 20 to increase a bearing friction force and avoid movement during the operation. The bearing plummer 10 is arranged under the main control buttons 7 for arcade game, so that the stability of the novel gamepad is improved, and the structure of the grips 2 are not interfered.

As shown in FIG. 2 to FIG. 3, one side of the bearing plummer 10 upwards extends to form a beveled hand support 11 connected to the gamepad body 1, which is conducive to uniformly supporting the hands and improving the operation convenience of the hands. In the arcade game input mode, the main control buttons 7 for arcade game are usually controlled with the right hand, and the lever is controlled with the left hand, so an inclination angle of the beveled hand support 11 gradually increases from the left grip 2 and the right grip 2, which facilitates the user to use the left and right hands cooperatively. During use, the bottom antiskid pad 20 contacts the desktop/user's thighs, so that the gamepad is hard to move. The user puts the wrists on the beveled hand support 11 for supporting, so that the overall force is uniform and conforms to the human engineering, which is conductive to further improving the stability and tapping accuracy when the main control buttons 7 for arcade game are triggered.

In this embodiment, as shown in FIG. 3, a battery compartment 12 is arranged in a space of the bearing plummer 10 arranged below the beveled hand support 11. The gamepad body 1 is provided with the buttons for the two input modes, and there are many parts and connecting lines inside the gamepad body 1, so that it is particularly important to make reasonable use of the space in this novel gamepad. Therefore, the novel gamepad has the advantages of reasonable structural design and full space utilization.

It should be noted that in this embodiment, the gamepad body 1 further includes a selector switch (not shown in the figure) for achieving switching between a traditional input mode and an arcade game input mode. In the traditional input mode, the D-pad 3, the ABXY buttons 4, the trigger buttons 5 and the thumb levers 6 receive an input signal. In the arcade game input mode, the main control buttons 7 for arcade game and the thumb levers 6 receive an input signal. Thus, when one input mode is used, the buttons of the other input mode can be prevented from being mistouched, so as to prevent a confusion of the buttons.

The working principle of the present disclosure is roughly as follows: In this embodiment, the grips 2, the D-pad 3, the ABXY buttons 4, the trigger buttons 5 and the thumb levers 6 suitable for PS4, X-Box and other games, and the main control buttons 7 for arcade game suitable for fighting arcade games are arranged on the gamepad body 1 at the same time, so that the gamepad has two input modes. A user can select the corresponding input modes when playing different games, so the novel gamepad can be applied to most games in the market. The novel gamepad has a wide application range and is favorable for improving the operating flexibility and improving the user experience.

The above is only used to explain the technical solution of the present disclosure, but not to limit the technical solution. Other modifications or equivalent substitutions made by those of ordinary skill in the art to the technical solution of the present disclosure shall fall within the scope of the claims of the present disclosure without departing from the spirit and scope of the technical solution of the present disclosure.

What is claimed is:

1. A novel gamepad, comprising a gamepad body (1), grips (2), and a D-pad (3), operation buttons (4), trigger buttons (5) and thumb levers (6) which are arranged on the gamepad body (1), wherein main control buttons (7) for arcade game are also arranged on the gamepad body (1); and the main control buttons (7) for arcade game are arranged on one sides of the thumb levers (6); and wherein the gamepad is capable of being switched between a traditional input mode and an arcade game input mode, in the traditional input mode, the D-pad (3), the operation buttons (4), the trigger buttons (5) and the thumb levers (6) receive an input signal; and in the arcade game input mode, the main control buttons (7) for arcade game and the thumb levers (6) receive an input signal.

2. The novel gamepad according to claim 1, wherein there are eight main control buttons (7) for arcade game comprising arcade game operation buttons and arcade game trigger buttons.

3. The novel gamepad according to claim 1, wherein an end surface of the gamepad body (1) far from a user is also provided with a touch-control panel (8), and an end surface close to the user is provided with a 3.5 audio output hole (9).

4. The novel gamepad according to claim 1, wherein the gamepad body (1) is provided with a plummer (10); and the plummer (10) is arranged under the main control buttons (7) for arcade game.

5. The novel gamepad according to claim 4, wherein one side of the plummer (10) upwards extends to form a beveled hand support (11) connected to the gamepad body (1); and an inclination angle of the beveled hand support (11) gradually increases from the left grip (2) to the right grip (2).

6. The novel gamepad according to claim 5, wherein a battery compartment (12) is arranged in a space of the plummer (10) arranged below the beveled hand support (11).

7. The novel gamepad according to claim 5, wherein a bottom from the left grip (2) to the right grip (2) and a bottom surface of the plummer (10) are located on the same horizontal plane.

8. The novel gamepad according to claim 1, wherein there are two thumb levers (6) symmetrically distributed on the gamepad body (1).

9. The novel gamepad according to claim 1, wherein the bottom surface of the plummer (10) is provided with an antiskid pad (20).

10. A novel gamepad, comprising a gamepad body (1), grips (2), and a D-pad (3), operation buttons (4), trigger buttons (5) and thumb levers (6) which are arranged on the gamepad body (1), wherein main control buttons (7) for arcade game are also arranged on the gamepad body (1); and the main control buttons (7) for arcade game are arranged on one sides of the thumb levers (6); and wherein the gamepad body (1) is provided with a plummer (10); and the plummer (10) is arranged under the main control buttons (7) for arcade game, one side of the plummer (10) upwards extends to form a beveled hand support (11) connected to the gamepad body (1); and an inclination angle of the beveled hand support (11) gradually increases from the left grip (2) to the right grip (2).

11. The novel gamepad according to claim 10, wherein a battery compartment (12) is arranged in a space of the plummer (10) arranged below the beveled hand support (11).

12. The novel gamepad according to claim 10, wherein there are two thumb levers (6) symmetrically distributed on the gamepad body (1), and the main control buttons (7) for arcade game are arranged between the thumb levers (6).

13. A novel gamepad, comprising:

a gamepad body (1);

two grips (2) connected to the gamepad body (1);

a D-pad (3), operation buttons (4), trigger buttons (5) and thumb levers (6) arranged on the gamepad body (1); and main control buttons (7) for arcade game arranged on the gamepad body (1) on one sides of the thumb levers (6);

wherein the gamepad body (1) further comprises a selector switch for achieving switching between a traditional input mode and an arcade game input mode;

in the traditional input mode, the D-pad (3), the operation buttons (4), the trigger buttons (5) and the thumb levers (6) receive an input signal; and in the arcade game input mode, the main control buttons (7) for arcade game and the thumb levers (6) receive an input signal.

\* \* \* \* \*